United States Patent [19]

Sovish et al.

[11] Patent Number: 4,579,148
[45] Date of Patent: Apr. 1, 1986

[54] HEAT-RECOVERABLE ARTICLE

[75] Inventors: Richard C. Sovish, Waterloo; Frank K. A. Selleslags, Haasrode; Marc F. L. Moisson, Strombeek Bever, all of Belgium

[73] Assignee: N.V. Raychem S.A., Kessel-lo, Belgium

[21] Appl. No.: 79,335

[22] Filed: Sep. 22, 1979

Related U.S. Application Data

[63] Continuation of Ser. No. 846,322, Oct. 29, 1977, abandoned.

[30] Foreign Application Priority Data

Oct. 29, 1976 [GB] United Kingdom ............... 45099/76

[51] Int. Cl.$^4$ .............................................. F16L 55/10
[52] U.S. Cl. ................................ 138/89; 174/DIG. 8; 174/138 F
[58] Field of Search ................ 138/89, 96 R, 96 T, 138/100; 174/DIG. 8, 83, 138 F, 65

[56] References Cited

U.S. PATENT DOCUMENTS

| | | | |
|---|---|---|---|
| 2,628,264 | 2/1953 | Esher | 174/83 |
| 3,395,382 | 7/1968 | Weagant | 174/DIG. 8 |
| 3,448,182 | 6/1969 | Derbyshire | 264/22 |

FOREIGN PATENT DOCUMENTS

| | | |
|---|---|---|
| 823722 | 11/1959 | United Kingdom . |
| 1220515 | 1/1971 | United Kingdom . |
| 1247383 | 9/1971 | United Kingdom . |
| 1336795 | 11/1973 | United Kingdom . |

Primary Examiner—Lenard A. Footland
Attorney, Agent, or Firm—Lyon & Lyon

[57] ABSTRACT

An article comprising a heat-recoverable conduit is provided with a plug or cap within or around said conduit to prevent the ingress of contaminants. The plug or cap comprises two principal parts; the first part, which is hollow, sits inside or around the conduit and the second part, which is attached to or in engagement with the first part, blocks the conduit. The second part can be detached or disengaged before recovery so that, for example, a supply line can be passed through the conduit and the first part can then be removed, destroyed or deformed prior to or during recovery. The plug or cap may also act to prevent premature recovery of the conduit.

7 Claims, 14 Drawing Figures

HEAT-RECOVERABLE ARTICLE

This is a continuation of application U.S. Ser. No. 846,322, filed Oct. 29, 1977, now abandoned.

BACKGROUND OF THE INVENTION

This invention relates to heat-recoverable articles and methods for their use.

Heat-recoverable articles, especially heat-shrinkable articles, are now widely used in many areas where insulation, sealing and encapsulation are required. Usually these articles recover, on heating, towards an original shape from which they have been previously deformed, but the term "heat-recoverable" as used herein also includes an article which, on heating, adopts a new configuration, even if it has not been previously deformed.

Heat-recoverable articles are typically made from polymeric materials exhibiting the property of plastic or elastic memory as described, for example, in U.S. Pat. Nos. 2,027,962 and 3,086,243. In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover. Finally, it has more recently been found that heat-recoverable articles can also be made from certain metal alloys. Such alloys, sometimes called "memory metals", are described for example in U.S. Pat. Nos. 3,174,851 and 3,351,463, and the book "Shape Memory Effects in Alloys" Jeff Perkins, Plenum Press, New York and London, 1975.

In many applications, especially those related to the installation and repair of supply lines such as electricity cables and gas pipes, the heat-recoverable articles are exposed to contaminants such as insects, moisture, gas leaks etc. which may damage or interfere with the functioning of the articles themselves and/or associated equipment. In general the material of the heat-recoverable article and its design ensure that the contaminants are excluded after recovery but problems may arise during storage and transport of the articles and/or in applications, such as the wall feed-through device described and claimed in British Pat. No. 1,245,119, where the heat-recoverable article may be installed on site some time before recovery is effected.

In yet other applications, it may be desirable to effect recovery of one portion of a heat-recoverable article whilst avoiding premature recovery of another portion. Amongst such articles there may be mentioned, for example, distribution caps for junction boxes in cable television systems such as CATV (Consumer Antenna Television). These distribution caps have a plurality of heat-shrinkable conduits each adapted to receive and, on heating, grip, a cable passing into the junction box. The number of cables passing into a given box may vary from area to area or from time to time, with the result that it may not be necessary to employ all of the conduits or that it may be desirable to employ some of the conduits during a first operation and others in a second, later operation. A serious problem arises, however, in that the necessary close proximity of the conduits makes it difficult, if not impossible, selectively to recover some of the conduits by heating without simultaneously at least partially shrinking the others.

Another article of this sort is a telephone exchange distribution box. A multicore cable comprising many individual wires is led into such a box, the unused wires being capped and remaining within the box whilst the other wires are led out through conduits which are heat-recovered to hold the wires in place and to seal the box. Further heat-recoverable conduits are, of course, provided for future use of the capped wires.

BRIEF SUMMARY OF THE INVENTION

The present invention provides an article having a heat-recoverable conduit therein, said conduit being provided with a plug or cap member comprising (a) a first hollow part which lies inside or outside a length of the conduit in contact with the wall thereof, and (b) a second part which blocks the conduit, the second part being so attached to or so in engagement with the first part that it can at least partially be detached or disengaged so as to leave the conduit open with the first hollow part still in position inside or outside the conduit but removable or deformable so that recovery can be effected.

DETAILED DESCRIPTION OF THE INVENTION

An important characteristic of the present invention is that the second part, which ensures the effective closure of the conduit, can be removed, still prior to recovery, so as to allow a substrate such as a supply line to be properly positioned within the conduit, before recovery is effected, whilst the first hollow part remains in position. Thus even if, as in many preferred applications, the conduit is provided with an internal lining of a hot-melt adhesive which may have become bonded to the first hollow part during partial recovery, to secure the plug or cap in position, the supply line can be located within the conduit without the worry of the premature recovery which might, for example, be caused by the heating necessary to soften the adhesive to remove a solid one-part closure such as a bung.

In certain applications it may be desirable for the plug or cap to be made from such a material that, and/or be so designed that, when in position inside or outside the conduit it prevents or at least impedes recovery thereof.

Accordingly in one aspect the present invention further provides a method of differentially recovering heat-recoverable conduits in a situation in which the heat required to recover one conduit might otherwise cause at least partial recovery of another conduit, which comprises blocking a conduit which is not required to recover with a plug or cap member as defined above whilst applying the heat necessary to cause the desired recovery of the other conduit or conduits.

In general, such conduits will be parts of a single article such as a telephone exchange distribution box or the two ends of an open tubular sleeve as described above and, in another aspect, the present invention provides a heat-recoverable article comprising a plurality of heat-recoverable conduits, one or more, but not all, of which is/are blocked with a plug or cap member as defined above.

Although, in certain applications, some or all of the conduits may be heat-expansible, they will, in most cases, be heat-shrinkable and, for convenience, the present invention will, from now on, be described with reference to heat-shrinkable conduits. In such cases, the plug member will in general be positioned within the conduit. However, in certain cases a cap member may be employed, part of which is positioned externally of the conduit, and which prevents recovery of the conduit by shielding it against heat applied to recover the other conduit(s).

The second part of the plug or cap acts to close the conduit against the ingress of moisture and other contaminants. In certain preferred embodiments it also acts to retain the first part in position inside or outside the conduit. That is to say, whilst the second part remains attached to said first part it is difficult to remove the plug or cap from the conduit. When, however, the second part is detached from the first part or is otherwise displaced before use of the conduit, the first part can itself relatively easily be removed or deformed. One simple manner in which this can be achieved is to form the second part with a flange which sits on a lip of the conduit and prevents movement of the plug or cap out from the conduit. Other means, for example screw threading, may also be employed.

The second part may be attached to the first part by, for example, a line of weakness so that it may be torn away from or knocked off the first part. However, other means may be employed to ensure that the second part is detachable from the first part or can otherwise be displaced. In this respect, it will be appreciated that, in many applications, it will be sufficient only partially to detach the second part from the first part so as to open the conduit prior to recovery.

The first part of the plug or cap member is preferably shaped or otherwise formed so as to facilitate its removal from the conduit when the second part has been detached or disengaged. In an especially advantageous embodiment, the surface of the hollow part in contact with the conduit, e.g. the outer surface of a generally cylindrical plug member, is slightly tapered, e.g. at an angle of from 1° to 10°, so that it "milks out" from the conduit when heat is applied to the latter to cause it to recover, the initial radial recovery forces of the conduit co-operating with the taper to cause the part to be expelled from the conduit in the direction of the longitudinal axis thereof.

In another embodiment, the first part may, for example, be formed as a screw-threaded part which is unscrewed from the conduit prior to recovery. (In this and other embodiments it may be advantageous partially to pre-shrink the conduit so that it firmly retains the plug.)

In certain embodiments of the present invention, the plug or cap member is advantageously made from a rigid but relatively fragile material, such as bakelite, so that it may be removed by breakage once it has fulfilled its function. It may additionally be advantageous to provide the plug or cap member with one or more lines of weakness, e.g. longitudinal grooves, to facilitate its breakage and removal.

In a further embodiment of the present invention, the first hollow part of the plug or cap member may be formed from a helically wound length of metal or plastics wire or strip, which can be removed simply by pulling one end to cause it to unwind.

In yet other embodiments the first hollow part may be so constructed that, and/or may be made from such a material that it need not be removed prior to or during recovery. For example, where differential recovery is required, the first part may be made from a material, such as a hot-melt adhesive, which has a melting or softening temperature such that it remains solid under the heat it experiences whilst other nearby conduits are being recovered but deformed, e.g. melts, upon direct application of heat to its own conduit. It will be appreciated that the first hollow part may also be constructed so as to be mechanically deformable, the deforming force being either the recovery force or an externally applied force.

DETAILED DESCRIPTION OF THE DRAWINGS

Figure 1:
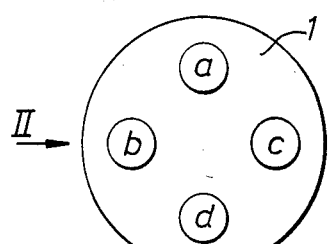
FIG. 1 represents the end of a distribution cap.
Figure 2:
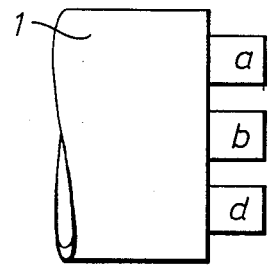
FIG. 2 is a side view taken along the line indicated by the arrow II in FIG. 1.
Figure 4:
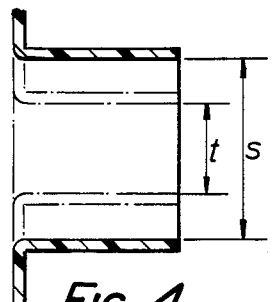
FIG. 4 is a section through an outlet conduit in a distribution cap.

In FIGS. 1 and 2 there is shown a distributor cap 1 provided with four heat-recoverable outlet conduits a, b, c, and d. FIG. 4 shows one of these conduits in more detail, the expanded inner diameter s of the conduit typically being about 30 mm and the recovered inner diameter t typically being about 15 mm. The inner surface of the conduit will, in general, be lined with suitable hot melt adhesive.

Figure 3:
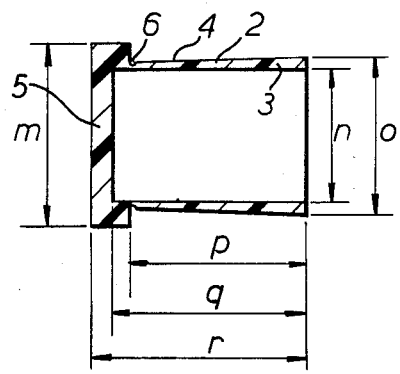
FIG. 3 is a section through a plug member.

FIG. 3 shows a plug member for use in accordance with the present invention in restraining recovery of the conduit of FIG. 4 whilst one or more of the other conduits is being recovered. As shown, the plug member 2 comprises a first part 3 which is adapted to be positioned within the conduit and which has an outer surface 4 which is tapered from one of its ends to the other and a second part 5 which is adapted to close the conduit whilst the plug member 2 is in position. A line of weakness comprising an annular groove 6 joins the first part 3 and the second part 5. The dimensions shown will typically be as follows: m=30 mm; n=22 mm; o=26 mm; p=30 mm; q=33 mm and r=36 mm. The slope of the outer surface 4 will typically be about 3%.

Figure 5:
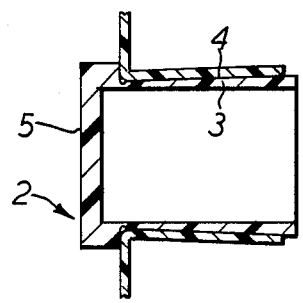
FIG. 5 illustrates the plug of FIG. 3 positioned inside the conduit of FIG. 4 prior to recovery.

In FIG. 5 the plug member 2 is shown positioned within the conduit. It can be seen that the tapered surface 4 of the first part 3 combines with the second part 5 effectively to prevent removal of the plug member 2 from the conduit in either direction. If desired the conduit may be partially preshrunk about part 3 of the plub member 2.

Figure 6:
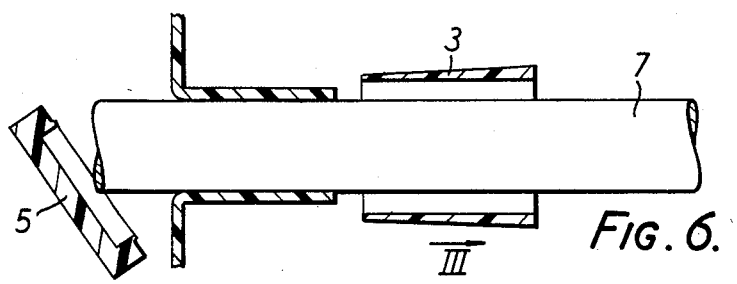
FIG. 6 illustrates the position after a cable has been passed through the conduit of FIG. 5, the plug member has been broken and removed and the conduit has been heat-recovered.

FIG. 6 shows the position after a cable 7 has been forced through the conduit breaking the second part 5 of the plug member 2 from the first part 3. Upon heat-recovery and shrinkage of the conduit the first part 3 has then been forced out in the direction shown by the arrow III with the result that the cable 7 is now securely gripped by and sealed within the conduit.

Figure 7:
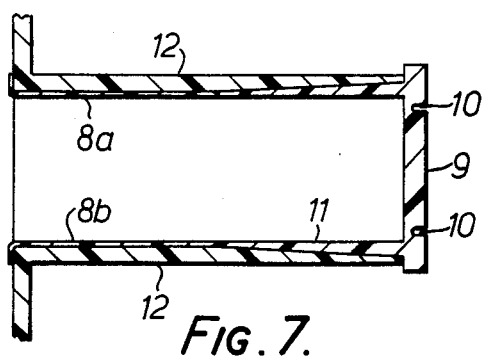
FIG. 7 illustrates a second form of plug member positioned within a conduit.

In the embodiment shown in FIG. 7 two fingers 8a and 8b retain the plug member in position prior to recovery. When it is desired to effect recovery, cap 9, which has a circular line of weakness 10, can be knocked out from a conduit by a cable and the fingers 8a and 8b can be moved together whereupon the conduit may shrink, the part 11 "milking out" as described above. If desired a further line of weakness 12 may be provided so that the fingers 8a and 8b can be broken away from part 11 prior to recovery.

Figure 8:
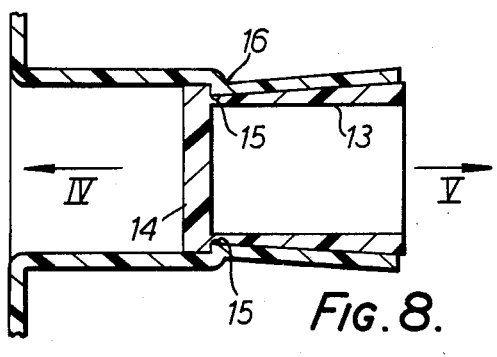
FIG. 8 illustrates a third form of plug member positioned within a conduit.

In FIG. 8 yet another form of plug member is shown which comprises a first part 13, having a tapered outer surface similar to that of the closure 2 of FIG. 3, and a second part 14. A line of weakness comprised by annular groove 15 separates the parts. As shown, in this embodiment the conduit has been partially preshrunk about the plug member so as to form an inner shoulder 16 which co-operates with parts 13 and 14 to prevent removal of the plug member, the remaining part of the conduit being non-shrinkable. However, when a cable is forced into the outlet, part 14 is broken off in the direction shown by arrow IV, and upon heating, part 13 "milks out" in the direction shown by arrow V to allow full recovery.

Figure 9:
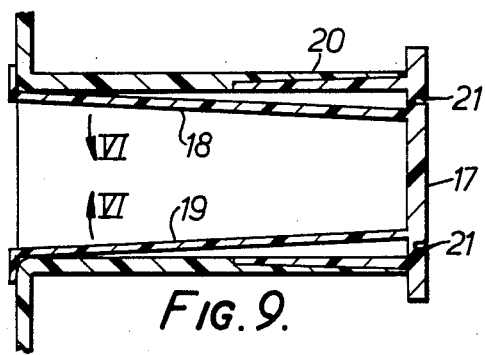
FIG. 9 illustrates a fourth form of plug member positioned with a conduit.

FIG. 9 shows yet another form of plug member in accordance with the present invention in which the second part 17 acts to block the conduit and is held in position by resilient fingers 18 and 19. This second part is attached to a tapered first part 20 via a line of weakness comprised by circular groove 21 and can be removed by breaking at this line of weakness when the resilient arms 14 and 15 are forced inwardly as shown by the arrows VI. The first part 20 then "milks out" as the conduit recovers.

Figure 10:
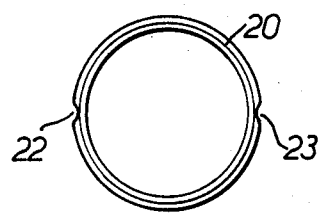
FIG. 10 is a section through said plug member.
Figure 11A:
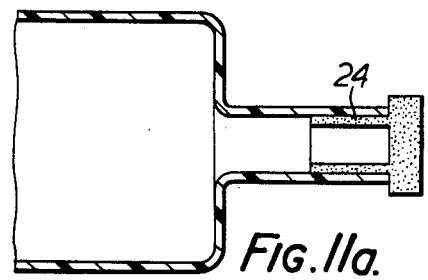
FIGS. 11a-d represent the use of yet another form of plug member in accordance with the present invention.
Figure 11B:
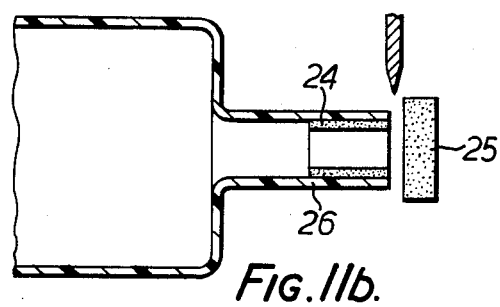
Figure 11C:
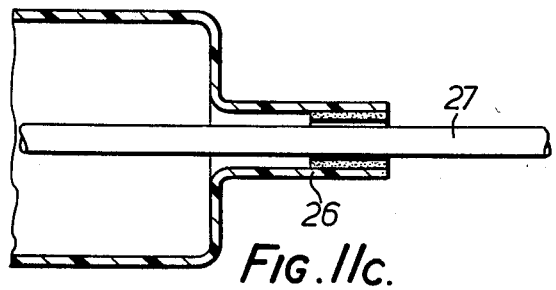
Figure 11D:
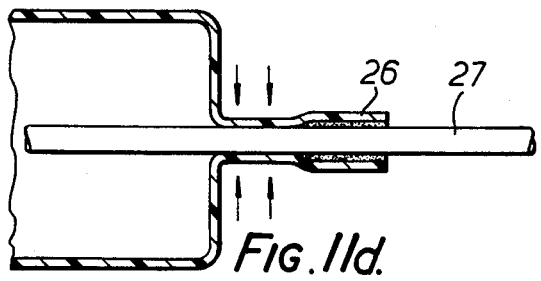

FIG. 10 shows how the first part 20 is provided with two diametrically opposed grooves 22 and 23 so that it can readily be broken, for example, manually or with a pair of pliers, after recovery has taken place.

FIGS. 11a–d illustrate a different type of embodiment in accordance with the present invention. In this embodiment a plug member 24 is made from a hot melt adhesive and is positioned within the outlet by partial shrinkage of the latter. When it is desired to effect full recovery the cap 25 of the plug member 24 is broken off from the recovery restraining tubular part 26. Cable 27 is then positioned within the conduit and heat recovery is effected, during the course of which tubular part 26 melts and acts as a sealing adhesive.

Whilst the present invention has been particularly described with reference to distribution boxes, tubular sleeves and feed-through devices it will be appreciated that it may be used in any application where an article comprising one or more heat-recoverable conduits is employed.

We claim:

1. A plugged heat shrinkable article comprising, in combination, a hollow heat shrinkable tubular member having an open end and a plug therefore, said plug comprising:
   (a) a first hollow tubular part extending into said heat shrinkable member through said open end and in contact with the inner wall thereof said hollow part having a tapered outer surface whereupon when said heat shrinkable member is heated to cause shrinkage it expels said hollow part therefrom, and
   (b) a second part which blocks the open end of said heat shrinkable member, said second part being in detachable engagement with said first part whereupon, when detached from said first part, the open end of the heat shrinkable member is unblocked.

2. An article having a heat-recoverable conduit therein, said conduit being provided with a plug or cap member comprising:
   (a) a first hollow part which is coaxial with the conduit and in contact with a wall thereof, the surface of the first hollow part in contact with the conduit being tapered so that the initial recovery forces of the conduit cause it to be expelled in the direction of the longitudinal axis of the conduit, and
   (b) a second part which blocks the conduit, the second part being detachably engaged with the first part to permit at least partial detachment from said first part so as to leave the conduit open with the first hollow part in its contacting coaxial position with said conduit.

3. An article according to claim 2 wherein said first hollow part is within said conduit, said conduit being heat-shrinkable.

4. An article having a heat-recoverable conduit therein, said conduit being provided with a plug or cap member comprising:
   (a) a first hollow part which is coaxial with the conduit and in contact with a wall thereof, said hollow part being shaped and positioned relative to said conduit so as to be expelled therefrom by the application of heat alone to said conduit to cause recovery, and
   (b) a second part which blocks the conduit, the second part being detachably engaged with the first part to permit at least partial detachment from said first part so as to leave the conduit open with the first hollow part in its coxial position but removable by the application of heat alone to the conduit to effect recovery.

5. An article according to claim 4 wherein said first hollow part is within said conduit, said conduit being heat-shrinkable.

6. An article having a heat-recoverable conduit therein, said conduit being provided with a plug or cap member comprising:
   (a) a first hollow part which is coaxial with the conduit and in contact with a wall thereof, said hollow part being shaped and positioned relative to said conduit so as to be expelled therefrom by the application of heat to said conduit to cause recovery, and
   (b) a second part which blocks the conduit, the second part being detachably engaged with the first part to permit at least partial detachment from said first part so as to leave the conduit open with the first hollow part in its contacting coaxial position but removable by the application of heat to the conduit to effect recovery.

7. An article according to claim 6 wherein said first hollow part is within said conduit, said conduit being heat-shrinkable.

* * * * *